US006451449B2

(12) United States Patent
Asakura et al.

(10) Patent No.: US 6,451,449 B2
(45) **Date of Patent: *Sep. 17, 2002**

(54) TERMINAL MATERIAL AND TERMINAL

(75) Inventors: Nobuyuki Asakura; Kei Fujimoto, both of Shizuoka (JP)

(73) Assignee: Yazaki Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/959,448

(22) Filed: Oct. 28, 1997

(30) Foreign Application Priority Data

Oct. 30, 1996 (JP) ........................................... 8-288468

(51) Int. Cl.[7] ......................... B32B 15/20; B32B 15/01; H01R 11/00

(52) U.S. Cl. ....................... 428/615; 439/886; 439/865; 174/84 C; 174/74 R; 428/646; 428/647; 428/648; 428/674; 428/675; 428/680

(58) Field of Search ............................ 174/74 R, 84 C; 439/865, 866; 428/646, 647, 648, 672, 674, 675, 680, 615, 655, 668, 669–671

(56) References Cited

U.S. PATENT DOCUMENTS

| | | | | | |
|---|---|---|---|---|---|
| 4,014,660 | A | * | 3/1977 | Schreiner et al. | 29/183.5 |
| 4,189,204 | A | * | 2/1980 | Brown et al. | 339/275 R |
| 4,503,131 | A | * | 3/1985 | Baudrand | 428/672 |
| 4,756,467 | A | * | 7/1988 | Schatzberg | 228/208 |
| 4,785,137 | A | * | 11/1988 | Samuels | 174/52 FP |
| 4,869,972 | A | * | 9/1989 | Hatagishi | 428/647 |
| 5,069,979 | A | * | 12/1991 | Nakajima et al. | 428/644 |
| 5,129,143 | A | * | 7/1992 | Wei et al. | 29/885 |
| 5,153,549 | A | * | 10/1992 | Morinaga et al. | 336/177 |
| 5,235,743 | A | | 8/1993 | Endo et al. | 29/685 |
| 5,307,562 | A | * | 5/1994 | Denlinger | 29/882 |
| 5,384,204 | A | * | 1/1995 | Yumoto | 428/626 |
| 5,442,145 | A | * | 8/1995 | Imai et al. | 174/267 |
| 5,780,172 | A | * | 7/1998 | Fister et al. | 428/647 |
| 5,849,424 | A | * | 12/1998 | Sugawara et al. | 428/674 |
| 5,853,557 | A | * | 12/1998 | Souza et al. | 205/109 |
| 5,916,695 | A | * | 6/1999 | Fister et al. | 428/647 |
| 6,083,633 | A | * | 7/2000 | Fister et al. | 428/615 |

FOREIGN PATENT DOCUMENTS

| | | | | |
|---|---|---|---|---|
| DE | G 92 16 717.9 | | 3/1993 | |
| DE | 196 06 116 A1 | | 8/1997 | |
| JP | 63-121693 | | 5/1988 | C25D/7/00 |
| JP | 5-1367 | | 1/1993 | C23C/10/28 |
| JP | 87960 | | 1/1996 | |
| JP | 8-7960 | * | 1/1996 | |
| JP | 8165582 | | 6/1996 | |

* cited by examiner

*Primary Examiner*—Deborah Jones
*Assistant Examiner*—Michael LaVilla
(74) *Attorney, Agent, or Firm*—Sughrue Mion, PLLC

(57) ABSTRACT

A terminal material is composed of a base material and a plurality of plating layers provided on the base material and containing an Sn-plating layer as its outermost layer. When the plating layers include an Ni-plating layer, the plating layers are formed so that the Sn-plating layer does not come in contact with the Ni-plating layer. A crimp portion of a crimp terminal is formed of the terminal material.

4 Claims, 2 Drawing Sheets

TERMINAL MATERIAL AND TERMINAL

BACKGROUND OF THE INVENTION

The present invention relates to an electric wire terminal material, and particularly relates to an electric wire crimp terminal material and a terminal using the terminal material.

A crimp terminal is used as an electric wire terminal such as a terminal which is excellent in connecting an electric wire to a suspender. Heretofore, a material having an Sn-plating layer provided on a base material composed of Cu or a Cu alloy such as brass is used as a material used for production of the crimp terminal. However, the terminal formed from the aforementioned material having an Sn-plating layer has a disadvantage that if the terminal is used under a high temperature for a long time, an oxide film is produced on a contact surface, that is, on a surface of the Sn-plating layer, to thereby increase contact resistance.

As a material to eliminate the aforementioned disadvantage, Japanese Patent Unexamined Publication No. Hei. 8-7960 discloses a terminal material in which in order to prevent easily oxidizable components of a base material from being diffused in the Sn-plating layer, an Ni-plating layer or a Co-plating layer is provided as an under layer, and the Sn-plating layer is provided on the under layer to thereby prevent the production of an oxide film.

The present inventors have found the following about the aforementioned terminal material having an Ni-plating layer as its under layer as disclosed in the aforementioned Publication. That is, the Ni-plating layer and the Sn-plating layer are diffused into each other to form an intermetallic compound; the intermetallic compound is easily oxidized when exposed to a high temperature; and a crimp portion of a crimp terminal formed of the material is difficult to be kept in an air-shielded contact state, so that contact resistance in the crimp portion still increases to make it impossible to eliminate the aforementioned disadvantage fundamentally. This means that the aforementioned terminal material cannot secure the long-term reliability at the terminal crimp portion.

SUMMARY OF THE INVENTION

Therefore, an object of the present invention is to provide a novel terminal material.

Another object of the present invention is to provide a terminal material suitable for a material for a crimp portion of a crimp terminal.

A further object of the present invention is to provide a terminal material capable of forming a crimp portion in which contact resistance hardly increases and long-term connection reliability is improved even in the case where the crimp portion is exposed to a high temperature for a long time.

A further object of the present invention is to provide a terminal having a crimp portion formed of the aforementioned terminal material.

The foregoing objects of the present invention can be achieved by a terminal material characterized in that a plurality of plating layers containing an Sn-plating layer as its outermost layer are provided on a base material, and when an Ni-plating layer is provided, the plating layers are formed so that the Sn-plating layer does not come in contact with the Ni-plating layer, and can be achieved by a terminal having a crimp portion formed of the terminal material.

The terminal material according to the present invention is configured so that a plurality of plating layers containing an Sn-plating layer as its outermost layer are provided, and even when an Ni-plating layer is provided, for example, a Cu-plating layer is provided between the Sn-plating layer and the Ni-plating layer so that the Sn-plating layer does not come in contact with the Ni-plating layer. Accordingly, no intermetallic compound is produced between Sn and Ni. Furthermore, oxidizable matters in the base material are prevented from being diffused into the Sn-plating layer. Accordingly, even in the case where the crimp portion of the terminal formed of the terminal material is exposed to a high temperature, the production of an oxide film at the contact portion is prevented so that the increase of contact resistance is reduced greatly.

DETAILED DESCRIPTION OF THE INVENTION

Preferred embodiments of the present invention will be described below with reference to the drawings.

In a terminal material according to the present invention, a plurality of plating layers containing an Sn-plating layer as its outermost layer are provided on a base material composed of Cu or a Cu alloy such as brass. Examples of the plating layers other than the Sn-plating layer include a Cu-plating layer, an Ni-plating layer, and a Pb-Ni-alloy-plating layer. Above all, the Cu-plating layer and the Ni-plating layer are preferred. However, when an Ni-plating layer is provided, the structure of the plating layers is determined so that the Ni-plating layer does not come in contact with the Sn-plating layer which is the outermost layer.

Figure 1:
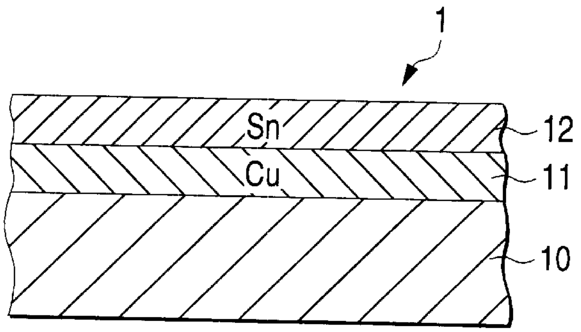
FIG. 1 is a schematic sectional view showing an embodiment of a terminal material according to the present invention.
Figure 2:
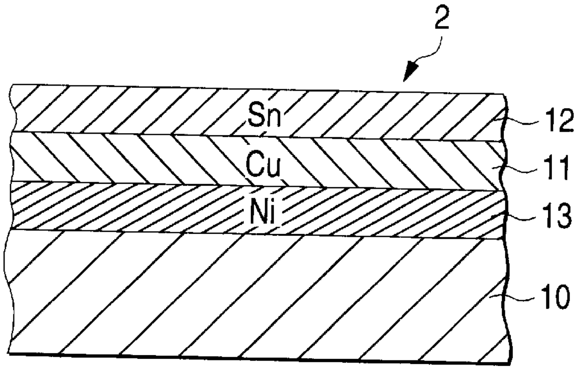
FIG. 2 is a schematic sectional view showing another embodiment of a terminal material according to the present invention.

FIGS. 1 and 2 show preferred configurations of plating layers of terminal materials according to the present invention.

A terminal material 1 in FIG. 1 has (A) a Cu-plating layer 11 provided on a base material 10, and an Sn-plating layer 12 as the outermost layer provided thereon.

A terminal material 2 in FIG. 2 has (B) an Ni-plating layer 13 provided on a base material 10, Cu-plating layer 11 provided thereon, and an Sn-plating layer 12 as the outermost layer provided thereon.

The preferred thicknesses of the aforementioned plating layers are as follows.

The above case (A):

| | |
|---|---|
| Cu-plating layer thickness | 0.5 to 1.0 μm |
| Sn-plating layer thickness | 1.0 to 3.0 μm |

The above case (B):

| | |
|---|---|
| Ni-plating layer thickness | 1.0 to 3.0 μm |
| Cu-plating layer thickness | 0.5 to 1.0 μm |
| Sn-plating layer thickness | 1.0 to 3.0 μm |

The predetermined plating layers are formed on a base material by a plating method which is commonly known, so that each of the aforementioned terminal materials according to the present invention can be produced.

Each of the terminal materials according to the present invention is used suitably as a material for forming a crimp portion of an electric wire crimp terminal.

That is, as described above, the present invention provides a terminal, preferably an electric wire crimp terminal, which has:

(1) a crimp portion formed of one of the aforementioned terminal materials; and (2) a contact portion.

Hereinafter, the aforementioned terminal material will be referred to as a crimp portion material.

The contact portion of the terminal according to the present invention is formed of a terminal material (hereinafter also referred to as contact portion material simply) in which a plurality of plating layers preferably containing an Sn-plating layer or an Au-plating layer as its outermost layer are provided on a base material.

Here, preferred examples of the plurality of plating layers in the aforementioned contact portion material include:

(C) an Ni-plating layer and an Sn-plating layer;

(D) an Ni-plating layer and an Au-plating layer;

(E) a Cu-plating layer, an Ni-plating layer and an Sn-plating layer; and (F) a Cu-plating layer, an Ni-plating layer and an Au-plating layer;

wherein the plating layers are provided on a base material in the aforementioned order. Incidentally, in each of the examples (D) and (F), an example in which a Pb—Ni-plating layer is provided between the Ni-plating layer and the Au-plating layer is preferred. Further, the aforementioned base material may be composed of Cu or a Cu alloy such as brass, similarly to the case of the crimp portion material of the present invention which was described above in detail.

Preferred thicknesses of the respective plating layers of the aforementioned contact portion materials are as follows. The above case (C):

| | |
|---|---|
| Ni-plating layer thickness | 1.0 to 3.0 μm |
| Sn-plating layer thickness | 1.0 to 3.0 μm |

The above case (D):

| | |
|---|---|
| Ni-plating layer thickness | 0.1 to 0.5 μm |
| Au-plating layer thickness | 0.1 to 0.5 μm |

The above case (E):

| | |
|---|---|
| Cu-plating layer thickness | 0.5 to 1.0 μm |
| Ni-plating layer thickness | 1.0 to 3.0 μm |
| Sn-plating layer thickness | 1.0 to 3.0 μm |

The above case (F):

| | |
|---|---|
| Cu-plating layer thickness | 0.5 to 1.0 μm |
| Ni-plating layer thickness | 1.0 to 3.0 μm |
| Au-plating layer thickness | 0.1 to 0.5 μm |

The thickness of a Pd—Ni layer provided as occasion demands is preferably 0.5 to 3.0 μm.

The aforementioned contact portion material is preferred in that the material has a function of suppressing diffusion from the terminal base material to the surface layer and a function of preventing the production of any oxide film in the surface contact portion.

Plating layers are formed by a known plating method so that the contact portion material described above in detail can be produced in the same manner as the crimp portion material.

Figure 5:
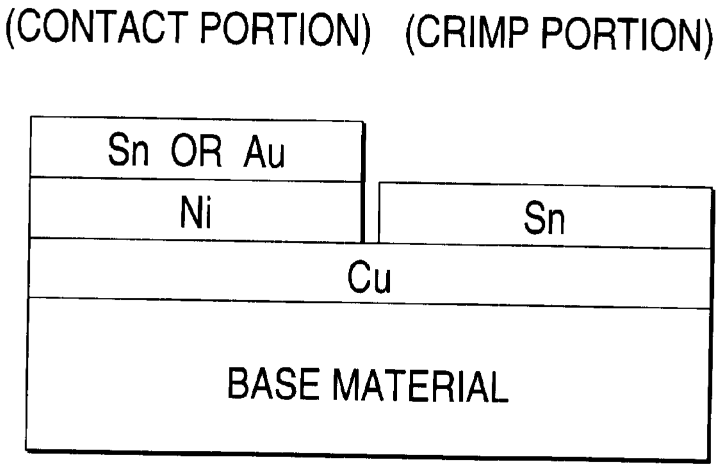
FIG. 5 is a schematic sectional view showing an embodiment of a terminal according to the present invention.
Figure 6:
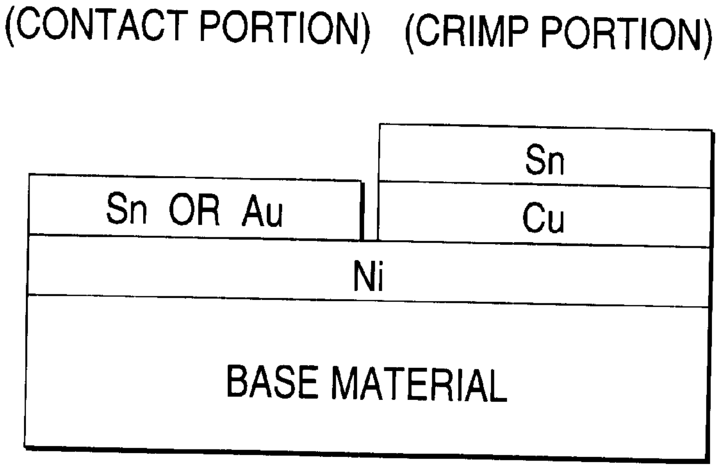
FIG. 6 is a schematic sectional view showing another embodiment of a terminal according to the present invention.

Further, as combinations of plating layers of the crimp portion material and plating layers of the contact portion material, a combination of (A) and (E) or a combination of (A) and (F) (FIG. 5), and a combination of (B) and (C) or a combination of (B) and (D) (FIG. 6) are preferred in terms of easiness in the production of the terminal according to the present invention and in terms of performance of the terminals of the invention.

The terminal according to the present invention is constituted by a crimp portion formed of the aforementioned crimp portion material, and a contact portion formed of the aforementioned contact portion material, so that the material constitutes the crimp portion is not necessarily the same material constituting the contact portion. A preferred method for producing the terminal will be described below.

The same base material is used for the crimp portion and the contact portion, and plating is applied to predetermined positions on the base material so as to form a crimp portion material and a contact portion material in the predetermined positions respectively. In other words, at least one plating later of the contact portion does not extend to the crimp portion, and/or at least one plating layer of the crimp portion does not extend to the contact portion. The resulting material is press-molded into a predetermined terminal shape, or partial plating is further applied to a predetermined position in the way of molding. Then, the resulting material is molded into the final form of a terminal. Thus, a terminal according to the present invention can be produced.

Even if the aforementioned terminal according to the present invention is exposed to a high temperature atmosphere for a long time as an electric wire crimp terminal, the increase of contact resistance in the crimp portion is lightened greatly so that it is excellent in long-term continuous reliability.

EXAMPLES

The present invention will be described below on the basis of examples, but the scope of the present invention is not limited to those examples.

Example 1

A terminal material (crimp portion material) having a structure shown in FIG. 2 was produced. Here, the thicknesses of the respective plating layers were as follows.

| | |
|---|---|
| Sn-plating layer thickness | 1.0 to 3.0 μm |
| Cu-plating layer thickness | 0.5 to 1.0 μm |
| Ni-plating layer thickness | 1.0 to 3.0 μm |

Further, a base material was brass.

The terminal material and an electric wire (oxygen-free copper) were connected while the crimping condition was changed (C/H: 1.00 mm (low), 1.15 mm (medium), 1.30 mm (high)). After the resulting material was then left in an oven at 120° C. for 500 hours, contact resistance at the crimp portion was measured. The result is shown in Table 1.

Comparative Example 1

Figure 3:
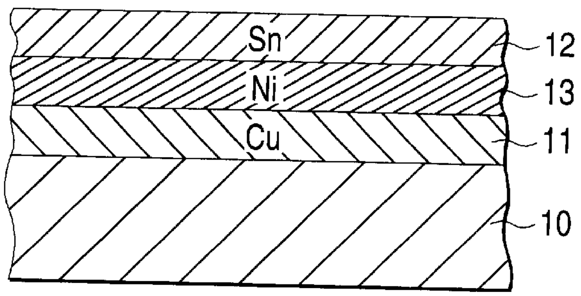
FIG. 3 is a schematic sectional view showing a terminal material produced in Comparative Example 1.

Example 1 was repeated except that the Cu-plating layer and the Ni-plating layer in Example 1 were exchanged to each other as shown in FIG. 3 so that the Sn-plating layer 12 and the Ni-plating layer 13 contacted each other directly. The result is shown in Table 1.

Comparative Example 2

Prior Art

Figure 4:
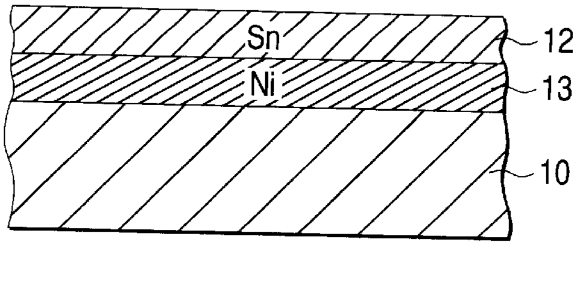
FIG. 4 is a schematic sectional view showing a terminal material produced in Comparative Example 2.

Example 1 was repeated except that the Cu-plating layer in Example 1 was not provided as shown in FIG. 4 so that the Sn-plating layer 12 and the Ni-plating layer 13 contacted each other directly, and except that contact resistance was also measured after the terminal material was left for 120 hours. The result is shown in Tables 1 and 2.

TABLE 1

| | Connection Resistance (mΩ) | | | |
|---|---|---|---|---|
| | Initial | Crimping Condition (C/H) | | |
| | Value | Low | Medium | High |
| Example 1 | 0.4 | 0.4 | 0.9 | 25 |
| Com. Example 1 | 0.4 | 0.4 | 3.3 | 400 |
| Com. Example 2 | 0.4 | — | 3.3 | — |

Note:
The terminal material was left at 120° C. for 500 hours.

TABLE 2

| | Contact Resistance (mΩ) | | |
|---|---|---|---|
| | Initial Value | 120 hours | 500 hours |
| Comparative Example 2 | 0.4 | 3.0 | 3.3 |

Note:
The crimp condition (C/H) was medium.

It is apparent from Tables 1 and 2 showing the results of the aforementioned Example and Comparative Examples that, when the terminal material according to the present invention is used for the crimp portion of the terminal, the increase of contact resistance is lightened greatly even in the case where the crimp portion is exposed to a high temperature. This fact means that the long-term connection reliability of the aforementioned crimp portion according to the present invention is secured. Furthermore, these data also show that the crimp condition (C/H) under which the long-term connection reliability is secured is wide-ranged..

When the terminal material according to the present invention is used for a crimp portion of a crimp terminal, the contact resistance hardly increases even in the case where the crimp portion is exposed to a high temperature. Consequently, the long-term connection reliability of the aforementioned crimp portion is secured in a wide range of the crimp condition (C/H).

What is claimed is:

1. A terminal material comprising:

a base material; and a first plurality of plating layers forming a contact portion and a second plurality of plating layers forming a crimp portion, respectively, said first plurality of layers and said second plurality of layers being provided on said base material and said second plurality of layers forming said crimp portion containing a Sn-plating layer as an outermost layer;

wherein said first plurality of plating layers and said second plurality of plating layers include a Cu-plating layer directly disposed on said base material;

wherein said first plurality of plating layers forming said contact portion further includes a Ni-plating layer directly disposed on said Cu-plating layer;

wherein said outermost Sn-plating layer of said second plurality of layers forming said crimp portion is directly disposed on said Cu-plating layer;

wherein an outermost layer of said first plurality of layers forming said contact portion is one of a Sn-plating layer and an Au-plating layer, wherein said outermost Sn-plating layer of said second plurality of layers does not contact said Ni-plating layer of said first plurality of layers, and wherein said Ni-plating layer of said first plurality of layers does not extend to said crimp portion.

2. A terminal material according to claim 1, wherein said base material is composed of a material selected from the group consisting of Cu and Cu alloys.

3. A terminal material comprising:

a base material; and a first plurality of plating layers forming a contact portion and a second plurality of plating layers forming a crimp portion, respectively, said first plurality of layers and said second plurality of layers being provided on said base material and said second plurality of layers forming said crimp portion containing a Sn-plating layer as an outermost layer;

wherein said first plurality of plating layers and said second plurality of plating layers include a Ni-plating layer directly disposed on said base material;

wherein said first plurality of plating layers forming said contact portion further includes an outermost layer of one of a Sn-plating layer and an Au-plating layer directly disposed on said Ni-plating layer;

wherein said outermost Sn-plating layer of said second plurality of layers forming said crimp portion is directly disposed on a Cu-plating layer, said Cu-plating layer being directly disposed on said Ni-plating layer;

wherein said outermost Sn-plating layer of said second plurality of layers forming said crimp portion does not contact said Ni-plating layer, and wherein said Cu-plating layer of said second plurality of plating layers does not extend to said contact portion.

4. A terminal according to claim 3, wherein said base material is composed of a material selected from a group consisting of Cu and Cu alloys.

* * * * *